July 11, 1961    J. C. BYSTRICKY ET AL    2,991,846
POSITIVE DISPLACEMENT CENTRALIZED LUBRICATION SYSTEMS
Filed March 6, 1958    3 Sheets-Sheet 3

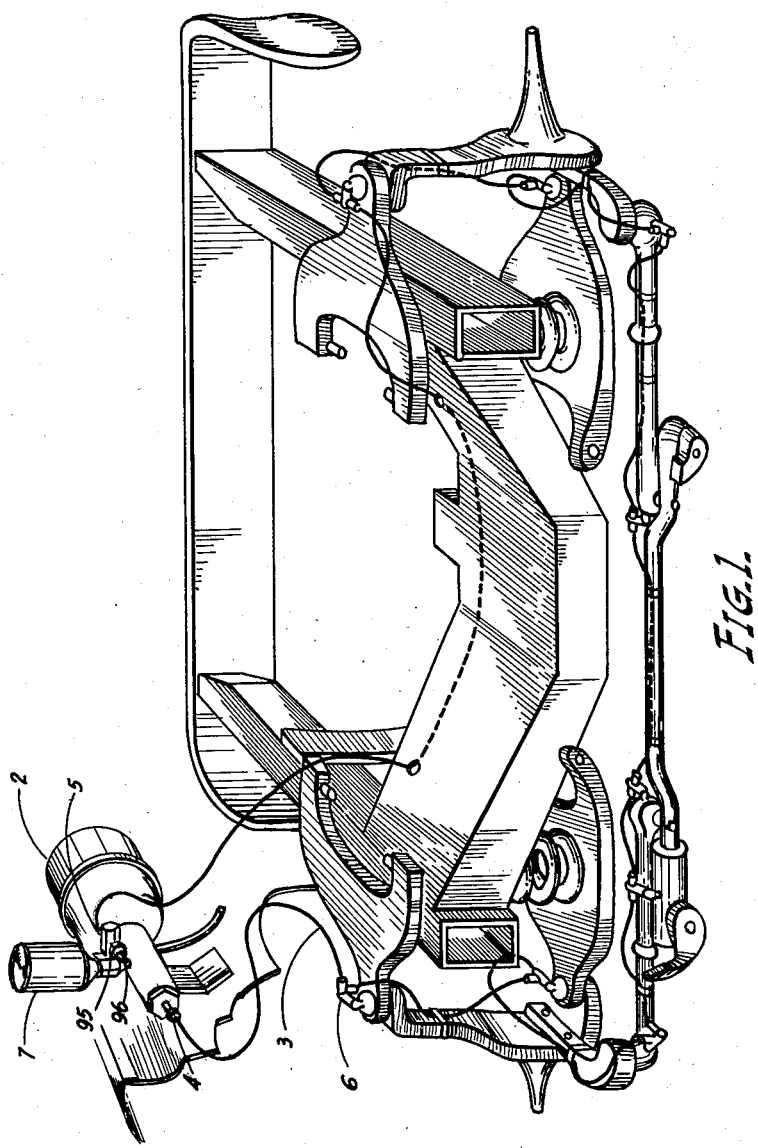
INVENTORS
JOSEPH C. BYSTRICKY
WILLIAM G. JENNINGS
BY John C Black
ATTORNEY

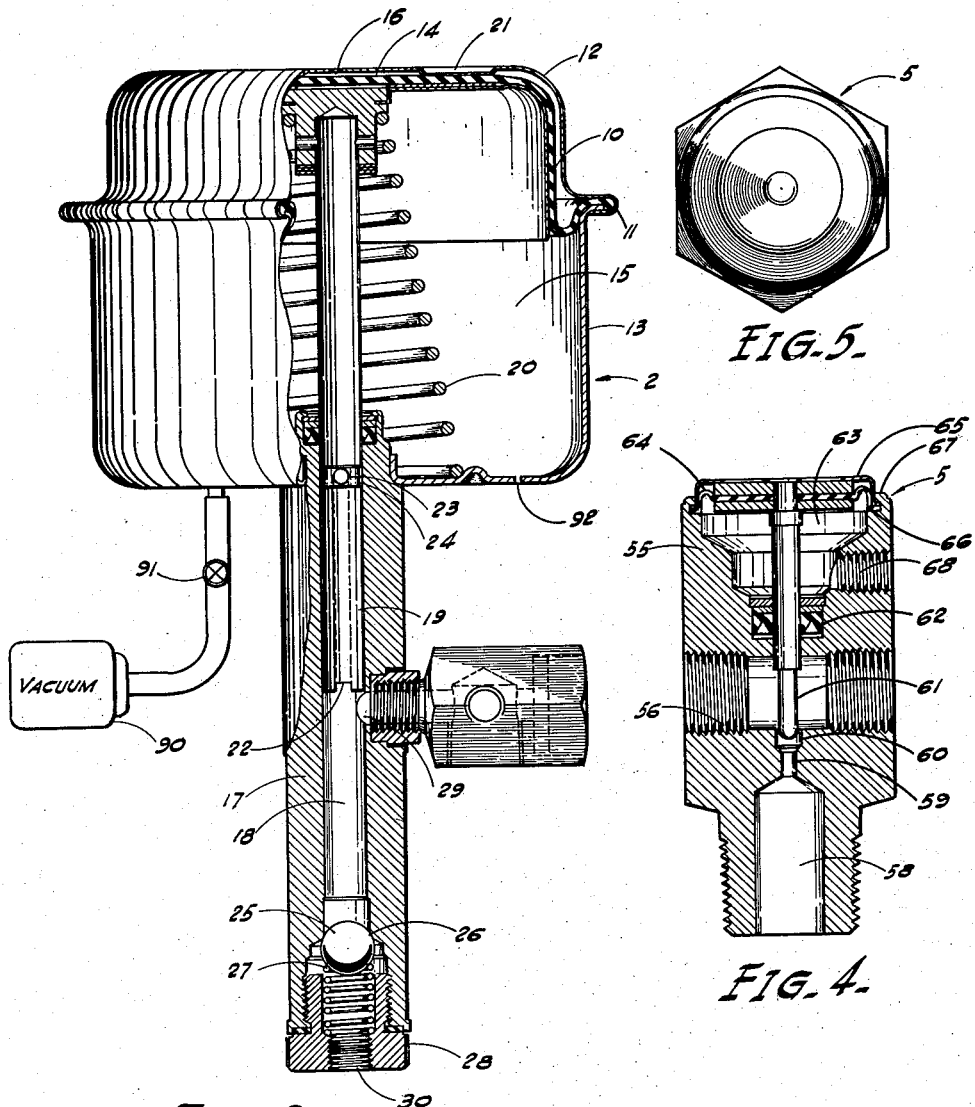

INVENTORS
JOSEPH C. BYSTRICKY
WILLIAM G. JENNINGS

BY John C. Black
ATTORNEY

United States Patent Office 2,991,846
Patented July 11, 1961

2,991,846
POSITIVE DISPLACEMENT CENTRALIZED LUBRICATION SYSTEMS
Joseph C. Bystricky, Crystal Lake, and William G. Jennings, Evanston, Ill., assignors to Stewart-Warner Corporation, Chicago, Ill., a corporation of Virginia
Filed Mar. 6, 1958, Ser. No. 719,669
8 Claims. (Cl. 184—7)

This invention relates generally to lubrication systems and more particularly to an improved economically feasible, single-line, closed-loop, positive-displacement centralized lubrication system.

The centralized lubrication system embodying the present invention is of a type in which a lubricant is accurately measured by positively displacing a piston through a measured stroke. This type of system is far more accurate than those systems which purport to measure lubricant through an orifice or other type of restriction.

Systems which measure the flow of lubricant to bearing surfaces with a reasonable degree of accuracy encounter serious problems with regard to the standardization of components for commercial applications with widely varying lubricant capacity requirements. Many prior art systems have suggested the use of a single measuring means such as a fixed displacement pump. However, this has not been commercially feasible for many centralized system applications because of the inability to provide component standardization. For example, in the automotive, truck, and farm equipment fields, the lubrication requirements vary from as little as 8 points to greater than 100 points. Consequently, commercial feasibility requires the provision of standardized equipment which can handle any and all requirements.

In the past, attempts to provide standardized equipment for the many varied requirements have been largely unsuccessful. Past efforts to develop equipment which is inexpensive yet sufficiently versatile to handle a sufficiently large number of system requirement variations proved to be unsuccessful. Proposed components such as variable displacement pumps, accumulator devices, etc. encountered prohibitively high cost and unduly troublesome and unsatisfactory operation.

The variable displacement pump systems require expensive parts tolerances and have definite limitations with regard to the variable number of points which they can handle. The systems utilizing an accumulator to store lubricant against a resilient spring pressure during pump operation and then permitting the stored lubricant to be discharged into the distribution system after termination of the pump operation result in excessive distribution line pressure losses unless expensive components are provided; and they do not provide accurately measured lubricant flows to each of the lubrication points without unduly expensive measuring components. The applicant by means of the unique system herein described permits the use of a very simple, inexpensive, fixed-displacement, single-stroke pump mechanism which can be utilized in systems having lubrication points varying anywhere from a few up to one hundred or more.

The one known prior attempt to provide such a simple system proved to be unsatisfactory in performance, encountered serious field problems, and had to be abandoned commercially. Over the many years since this attempt, such a system has been considered by the experts in the art as doomed to failure.

In the earlier attempt to provide a single-line, positive-displacement centralized lubrication system, transfer piston mechanisms were used which involved the use of pistons having varying clearances with their respective measuring cylinder depending upon the type of lubricant handled. These designs required close tolerance fits on inlet and outlet valve seats and were characterized by numerous component parts in the piston assembly. They were somewhat substantial in size, high in cost, and never gained satisfactory public acceptance.

Because no versatile system of reasonable cost and with satisfactory performance was ever developed, the entire field of automotive, truck, and farm machinery equipment resorted to manual lubrication with hand guns and power gun equipment. In a few instances, the less desirable, non-measuring, orifice type systems were used as a compromise.

Accordingly, it is the primary object of the present invention to provide an improved, unusually versatile centralized lubrication system which is so economical and which requires so few differing components that an entirely new market can be commercially satisfied. The improvements are the result of the provision, in a single-line, closed, hydraulic system, of an improved pump and vent means, of an improved measuring valve, and an improved end of line relief valve. All of improved elements cooperate to produce a commercially feasible system with inexpensive standardized components for widespread applications having widely varying lubrication requirements.

A feature of the present invention is the provision, in a single-shot, fixed-displacement pump, of a pressure relief means effective at the end of the piston stroke and characterized by the physical engagement of the outlet check valve with the pump piston to hold the valve open and characterized by a piston passageway connecting the pump outlet to the pump inlet when the valve is held open by the piston.

A feature of the present invention is the transfer of pump output pressure across the piston of a measuring valve in a one-to-one ratio by providing a simple, closed hydraulic system in which the system lubricant flow is essentially nil. Thus, the pump pressure is transmitted undiminished to the bearings.

A related feature is the use of a simple, compact measuring valve characterized by a simple piston assembly of rubber fused to steel.

A feature of the present invention is the provision of a unique end of line pressure relief device which permits the use of a simple, inexpensive, fixed-displacement pump which accomplishes lubrication of all bearings with one stroke without regard to the number of bearings connected to the system. The relief device includes differential operating areas controlled by the end of the line lubricant pressure and by the fluid which operates the pump to prevent an end of the line pressure higher than a pressure slightly below that which the pump produces under any operating fluid pressure.

The sum total of the above features all cooperatively arranged in a system has resulted in the opening of an entirely new market for centralized lubrication—a market including industrial equipment, farm machinery equipment, and domestic and commercial vehicles.

Other objects and features will be evident upon a perusal of the following description of which:

FIG. 1 shows a preferred embodiment of the invention applied to a vehicle chassis;

FIG. 2 shows one form which the system pump may take;

FIG. 4 is an elevation view showing one form which the end of line valve may take;

FIG. 5 is a plan view of the end of line valve of FIG. 4; and

Figure 6:
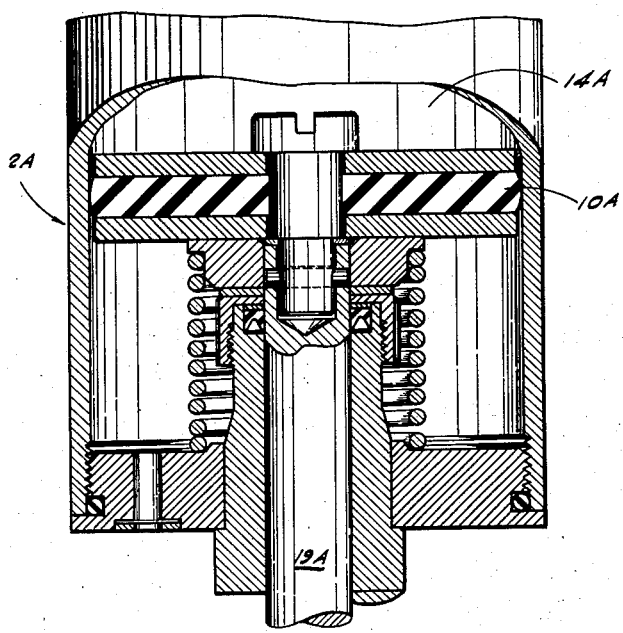
FIGS. 6 and 7 show a modified pump and end of line valve respectively.

With particular reference to FIG. 1, it can be seen that a typical system embodying the features of the present invention may comprise a lubricant pump 2 connected to a single lubricant distribution line 3 which extends from the outlet 4 of the pump to each of the vehicle bearings to be lubricated and thence to an end of line valve assembly 5. A measuring valve 6 is provided at each bearing point and is connected to the lubricant line 3 in such a manner that all of the measuring valves are connected in parallel to the line 3 without interupting or restricting lubricant flow through the line. The end of line valve mechanism 5 provides one means of preventing excessive line pressures and for returning excess lubricant to the lubrication reservoir 7.

One embodiment of the pump 2 is shown in FIG. 2. The pump 2 (which includes a fluid motor portion) comprises a cup-shaped diaphragm 10, which is suitably supported between flanged edges 11 of a pair of mated cup-shaped case elements 12 and 13. The diaphragm 10 divides the case, formed by the elements 12 and 13, into a pair of chambers 14 and 15. The chamber 14 is vented to atmosphere through the aperture 16. The working chamber 15 is suitably connected in any well-known manner to a source of vacuum 90, for example, the vehicle engine manifold, by way of a valve 91. A very restricted vent 92 is provided in the element 13.

A cylindrical element 17 is suitably secured in sealing relation to the central lower end of the case element 13. The element 17 has an axial bore which defines a pumping chamber 18. A lubricant piston 19 is suitably secured to the central portion of the diaphragm 10 for movement with the diaphragm. The lower end of piston 19 is received in the pumping chamber 18. A compression spring 20 urges the piston 19 and the diaphragm 10 to the position shown in FIG. 2 in engament with depressions 21 on the upper surface of the case element 12.

The lower end of the piston 19 which is received in the chamber 18 has a central bore 22. Transverse bores 23 are provided in the central portion of the piston 19 in communication with the upper extremity of the central bore 22. An annular groove 24 is provided at the central portion of the piston 19 in communication with the bores 23.

The lower end of the element 17 is provided with a check valve 25 normally held on its seat 26 by a compression spring 27. A bolt 28 maintains the check valve assembly in place at the lower end of the pumping chamber 18.

A lubricant inlet 29 is provided for the pumping chamber 18 at a position immediately below the lower edge of the piston 19 when the piston is in its normal uppermost position as shown in FIG. 2. The inlet 29 communicates with the lubricant reservoir 7 (FIG. 1). A threaded outlet passageway 30 (FIG. 2), provided in bolt 28, is connected to the distribution line 3 (FIG. 1).

Figure 3:
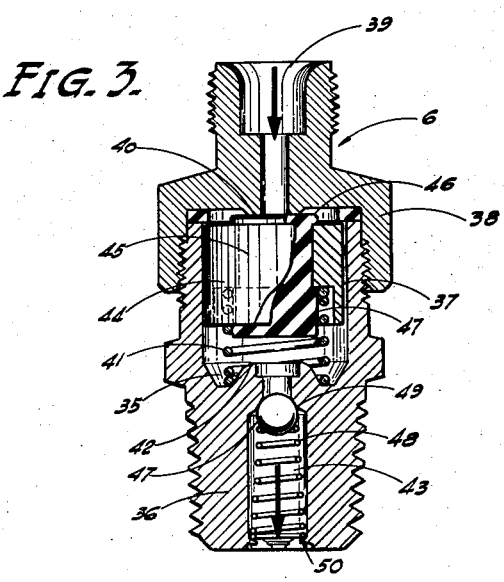
FIG. 3 shows a measuring valve assembly.

The measuring valves 6 comprise a measuring displacement chamber 35 (FIG. 3) defined by a lubricant fitting body 36 and the downstream end of a displacement piston 37 received within a cylindrical bore of the fitting 36 for relative reciprocable movement. A threaded coupling nut 38 is threaded on the fitting 36 to confine the displacement piston 37 within the fitting 36. The coupling nut 38 provides a lubricant inlet passageway 39 which is connected in any suitable manner in fluid conducting relation with the distribution line 3. The coupling nut 38 is provided with an annular seat 40 at the lower end of the passageway 39. With no pressure in the distribution line 3, the piston 37 is urged upwardly (FIG. 3) into sealing engagement with a seat 40 by a compression spring 41.

The fitting 36 is provided with an annular seat 42 at the upper end of a lubricant outlet pasasageway 43. With sufficient pressure in the lubricant line 3, the piston 37 will be urged downwardly into sealing engagement with the seat 42.

The piston 37 comprises an annular metallic ring 44 and a central cylindrical element 45 of a resilient material, such as rubber, rigidly held in the metallic ring 44 by upper and lower flanges 46 and 47. The metallic ring 44 provides a loose fit with the piston 37 and a minimum frictional resistance between the piston 37 and the wall of the measuring chamber 35. The rubber insert 45 provides a simple and effective sealing means when in engagement with the seats 40 and 42.

A check valve 47 is provided in the outlet passageway 43. A compression spring 48 retained by the swaged shoulder 50 at the lower end of the passageway 43 urges the valve 47 upwardly (FIG. 3) into engagement with a seat 49.

The end of line valve assembly 5, shown in FIG. 4, comprises a generally annular body 55 having a central cross bore 56.

One end of the cross bore 56 is connected to the end of the lubricant distribution line 3, and the other end is connected to a pressure responsive device 95. The pressure responsive device may be in one of a number well-known in the art for giving a visual or audible signal when the pressure in the cross bore 56 reaches a predetermined value, for example, a simple spring-loaded pin 96.

The pressure relief device provides a positive indication of the operation or malfunction of the system. Inasmuch as it is located at the end of the line, it positively indicates that the reservoir 7 was filled with lubricant, that desired pressure was built up in the system, that no serious line break has occurred, that their is no obstruction in any part of the line, that the pump fluid source has been properly applied to the system, and that the pressure relief means is functioning properly.

An axial passageway 58 is provided at the lower end of the valve assembly 5 in communication with the cross bore 56 at its upper end and in communication with the lubricant reservoir 7 at its lower end. The passage 58 is restricted at 59 and provides a valve seat 60 immediately above the restriction.

A piston 61 is disposed for coaxial reciprocable motion within the body 55. The lower surface of the piston 61 is rounded to seat upon the valve seat 60 to close passageway 58 from the cross bore 56 in the lowermost position of the piston 61.

A suitable sealing, guiding and retaining structure 62 prevents leakage around the piston 61 and guides the piston.

A chamber 63 is provided at the upper end of the body 55. The chamber 63 is sealed from the atmosphere by a diaphragm 64 which is suitably secured to the upper end of the piston 61. A cup-shaped annular retaining plate 65 holds the outer circumferential edges of the diaphragm 64 in sealing engagement with a shoulder 66 on the body 55. The upper circumferential edge 67 of the body 55 is curled over the retaining plate 65 to securely hold it in place.

A cross bore 68, which communicates with the chamber 63, is connected to the same vacuum source as the pump 2 and at the same times.

The operation of the system disclosed in FIGS. 1-5 will now be described. When the source of vacuum 90 is connected to the chamber 15 (FIG. 2) of the pump 2, for example by a periodically operated valve 91, atmospheric pressure forces the diaphragm 10 downwardly. The piston 19 moves with the diaphragm 10 to close the lubricant inlet 29. Further movement of the piston 19 causes pressure to be developed in chamber 18. This pressure causes the outlet check valve 25 to open and results in the transmission of lubricant under pressure into the lubricant line 3 (FIG. 1).

The lubricant pressure is applied simultaneously to all lubricant measuring fittings 6 inasmuch as the line 3 is filled with lubricant. As the piston 19 continues to move, the pressure increases until the measuring valves 6 are operated and subsequently the end of line valve 5 is operated to prevent excess line pressure. Excess lubricant is returned to the lubricant reservoir 7 through the end of line pressure relief device 5.

Further movement of the piston 19 results in the groove 24 in the piston 19 communicating with the inlet 29 from reservoir 7. Simultaneously, the end of piston 19 contacts outlet check 25 and physically holds it off of the seat 26. The pressure which has been developed in the line 3 is rapidly relieved through the bores 22 and 23, the groove 24 and the inlet 29. Thus, the pump develops pressure and subsequently relieves the pressure which has been developed, all on the forward stroke.

Subsequently, when the source of vacuum is removed from the chamber 15, the diaphragm 10 and the lubricant piston 19 begin to return to the upper position under the force of spring 20. The outlet check valve 25 closes, and a partial vacuum is developed in lubricant chamber 18. When the piston 19 has been withdrawn sufficiently to uncover the inlet 29, lubricant is forced into the chamber 18 under the influence of atmospheric pressure to restore the initial conditions. Thus, the pump chamber is recharged with lubricant for the succeeding cycle of operation.

When the pump 2 begins its stroke as described above, lubricant is held in the line 3 and in the measuring valve displacement chamber 35 beneath the piston 37. The outlet check valve 47 is closed, and the rubber insert 45 is in sealing relation against upper seat 40. The rubber insert 45 is out of contact with lower valve seat 42. Pressure from pump 2 is applied to the measuring valves 6 through the line 3. The lubricant pressure builds up against the small area of the rubber insert 45 which is exposed by seat 40. The force of spring 41 retains the valve against the seat 40 until a predetermined pressure setting is reached. At this point, the pressure acting on the small area causes the piston 37 to lift slightly from the upper seat 40. The entire upper surface of the piston 37 is then exposed to the rising pressure in passage 39. As a result, the piston 37 is forced rapidly downwardly to seat the rubber insert 45 against the lower seat 42. This movement of the piston 37 causes lubricant pressure to be developed in the chamber 35, which causes the outlet check valve 47 to open, admitting lubricant to the bearing or other point of lubrication. When the rubber insert 45 contacts the lower seat 42 further discharge of lubricant is precluded and the system remains closed.

When the pressure in the line 3 is relieved through the venting action of the pump 2, the pressure falls to a value at which the spring 41 can overcome the force against the area of lower seat 42 and the piston 37 begins to return. At this point, outlet check 47 closes and lubricant is transferred through a carefully controlled clearance between piston 37 and the adjacent inner periphery of the fitting body 36 under the influence of the partial vacuum developed in chamber 35. At the completion of the recharge action, the upper surface of the insert 45 is returned to rest against upper seat 40; and the measuring valve 6 is returned to its initial condition. Thus, lubricant is measured out by the rapid downward movement of piston 37 (so rapid that the transfer of lubricant around the piston is negligible) and is recharged through a slow return of the piston 37 against a partial vacuum.

When the vacuum source 90 is connected to the pump 2 to initiate its operation, the vacuum is also connected to chamber 63 of the end of line valve assembly 5. Atmospheric air forces the diaphragm 64 downwardly. The piston 61 moves down with the diaphragm 64 to engage the seat 60 to close the end of line valve bore 56 from the passage 58. Lubricant pressure then produced by the pump 2 builds up in the line 3 and in the bore 56. The lubricant pressure in the bore 56 acts on the differential cross-sectional area between the portion of piston 61 received in the sealing structure 62 and the portion of the piston which sealingly engages the valve seat 60.

The ratio of the effective area of the diaphragm 64 to this differential area will be referred to hereinafter in the specification and claims as the effective ratio of the valve 5. The force produced by the lubricant pressure in the bore 56 on the piston 61 acts against the force on the diaphragm 64 produced by the differential pressure between the vacuum source and atmosphere.

The lubricant output pressure produced by pump 2 equals the pressure differential between the vacuum source and atmospheric pressures multiplied by the ratio of the effective cross-sectional area of the diaphragm 10 to the cross-sectional area of the pump piston 19. The term "effective ratio" of the pump as used hereinafter in the specification and claims means this ratio of the diaphragm and piston areas—i.e. the effective diaphragm area divided by the piston area.

This lubricant output pressure of the pump is applied to the valve 5 by the excess capacity of the pump 2 after the measuring valves 6 have received their lubricant requirements for discharging measured amounts of lubricant. The effective ratio of the relief valve 5 is less than the effective ratio of the pump 2. Since the same vacuum pressure is applied to both the relief valve and to the pump, lubricant pressure at the end of the line will overcome the force on the diaphragm 64 to raise the piston 61 off its seat 60 at a pressure somewhat below the maximum pressure which can be produced by the pump.

Hence, excess lubricant forced into the system by the pump will be returned to the reservoir 7 by way of the passage 58. This permits the piston 19 in the pump 2 to complete its forward stroke as previously described, regardless of the displacement requirements of the lubricating system. This lower pressure at the end of the line is more than adequate for assuring the proper operation of all of the measuring valves 6, and this pressure is maintained throughout the line 3 so long as vacuum is applied to the pump and the relief valve. Hence, reliable operation of each and every measuring valve 6 in the system is assured, even with a long line and a high number of valves.

When the vacuum source 90 is disconnected from the pump 2 and from the valve 5, the valve 5 opens against any residual end of the line lubricant pressure and remains open even after the system pressure is returned to normal. This provides an auxiliary path for the relief of lubricant pressure from the system, and permits the handling of heavy-bodied lubricants on a relatively short pressure cycle.

The modified pump 2A, shown partially in FIG. 6, is substantially the same as pump 2 of FIG 2 except that high pressure air is admitted to the chamber 14A above the piston 10A to operate the pump 2A. Also, the pump 2A would be provided with a different desired effective ratio (lubricant output pressure to air input pressure).

Figure 7:
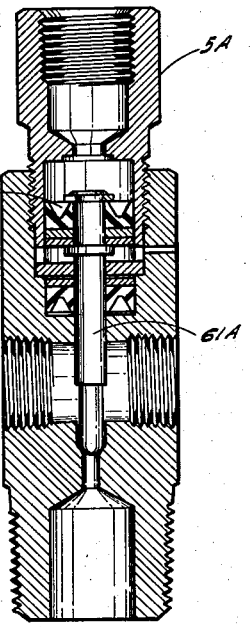

The modified end of line relief valve assembly 5A, shown in FIG. 7, is substantially the same as the valve assembly 5 of FIG. 4 except that high pressure air is applied to an enlarged piston surface 64A to urge a smaller piston 61A downwardly.

The operation of a high pressure air operated system utilizing pump 2A and valve 5A is similar to the system disclosed in FIGS. 1–5.

While there has been described what is at present believed to be the preferred embodiments of the invention, it will be understood that various changes and modifications may be made therein; and it is contemplated to include in the appended claims all such changes and modifications as fall within the true spirit and scope of the invention.

What is claimed is:

1. A centralized lubrication system comprising a single-stroke, fixed-displacement lubricant pump having an effective ratio connected to a source of lubricant and having a lubricant outlet, a fluid motor for the pump connected to a source of fluid at an absolute pressure differing from atmospheric pressure, a single lubrication line connected to the pump outlet, a plurality of lubricant measuring valves having lubricant inlets connected in parallel with each other to the lubricant line, and a pressure relief valve connected to the end of the lubricant line, said relief valve including a first chamber connected in lubricant conducting relation with the end of the line and with the source of lubricant, a second chamber connected to the source of fluid each time that the motor is connected to the fluid source, and valve means including a reciprocable operating structure disposed in both chambers to control the flow of lubricant from the end of the line to the lubricant source, the reciprocable operating structure defining a pair of operating surfaces having relative effective areas with a ratio that is a predetermined amount smaller than the effective pump ratio, one of the surfaces acted upon by the lubricant in the first chamber and the other surface acted upon by the fluid in the second chamber to prevent pressures at the end of the line greater than a desired pressure lower than that produced by the pump at its outlet while fluid pressure is applied to the fluid motor and to the relief valve, and to assure complete relieving of the lubricant pressure at the end of the line when the fluid source is disconnected from the motor and relief valve.

2. The combination claimed in claim 1 together with a pressure responsive indicating device connected at the end of the line for detecting system faults.

3. A centralized lubrication system comprising: a lubricant pump having an effective ratio connected to a source of lubricant, having a single-stroke, fixed-displacement piston, and having a lubricant outlet; a fluid motor for the pump connected to a source of fluid at an absolute pressure differing from atmospheric pressure; a single lubrication line connected to the pump outlet; valve means operated by the piston in its fully operated position for relieving lubricant pressure in the line; a plurality of lubricant measuring valves having lubricant inlets connected in parallel with each other to the lubricant line; and a pressure relief valve including a first lubricant chamber connected in lubricant conducting relation with the end of the line and with the source of lubricant, a second chamber connected to the source of fluid each time that the motor is connected to the fluid source, and valve means including a reciprocable operating structure disposed in both chambers to control the flow of lubricant from the end of the line to the lubricant source the reciprocable operating structure defining a pair of operating surfaces having relative effective areas with a ratio that is a predetermined amount smaller than the effective pump ratio, one of the surfaces acted upon by the lubricant in the first chamber and the other surface acted upon by the fluid in the second chamber to prevent pressures at the end of the line greater than a desired pressure lower than that produce by the pump at its outlet while fluid pressure is applied to the fluid motor and to the relief valve, and to assure complete relief of the lubricant pressure at the end of the line when the fluid source is disconnected from the motor and relief valve.

4. A centralized lubrication system comprising a single-stroke, fixed-displacement lubricant pump having an effective ratio connected to a source of lubricant and having a lubricant outlet, a fluid motor for the pump connected to a source of fluid at an absolute pressure differing from atmospheric pressure, a single lubrication line connected to the pump outlet, a plurality of measuring valves having lubricant inlets connected in parallel with each other to the lubricant line, and a pressure relief valve connected to the end of the lubricant line, said valve including a first chamber connected in lubricant conducting relation with the end of the line and with the source of lubricant, a second chamber connected to the source of fluid each time that the motor is connected to the fluid source, a piston and piston seat in the first chamber to control the flow of lubricant from the end of the line to the lubricant source, the piston defining a surface subjected to lubricant pressure in the first chamber and having a reciprocable element in the second chamber connected to the piston with a surface subjected to the fluid pressure in the second chamber, the piston and element surfaces having relative effective cross sectional areas with a ratio that is a predetermined amount smaller than the effective pump ratio, whereby the fluid pressure acting on the element surface and the end of the line lubricant pressure acting on the piston surface prevent pressures at the end of the line greater than a desired pressure lower than that produced by the pump at its outlet while fluid pressure is applied to the fluid motor and to the relief valve, and whereby the relief valve assures complete relief of the lubricant pressure at the end of the line when the fluid source is disconnected from the motor and relief valve.

5. A centralized lubrication system comprising a single stroke, fixed-displacement lubricant pump having an effective ratio connected to a source of lubricant and having a lubricant outlet, a fluid motor for the pump connected to a source of fluid at an absolute pressure differing from atmospheric pressure, a single lubrication line connected to the pump outlet, a plurality of lubricant measuring valves having lubricant inlets connected in parallel with each other to the lubricant line, each measuring valve including a piston operated rapidly in one direction in response to a predetermined line pressure to discharge a measured amount of lubricant and operated slowly in the opposite direction in response to a lower pressure to permit recharging of the valve, and a pressure relief valve connected to the end of the lubricant line, said relief valve including a first chamber connected in lubricant conducting relation with the end of the line and with the source of lubricant, a second chamber connected to the source of fluid each time that the motor is connected to the fluid source, and valve means including a reciprocable operating structure disposed in both chambers to control the flow of lubricant from the end of the line to the lubricant source, the reciprocable operating structure defining a pair of operating surfaces having relative effective areas with a ratio that is a predetermined amount smaller than the effective pump ratio, one of the surfaces acted upon by the lubricant in the first chamber and the other surface acted upon by the fluid in the second chamber to prevent pressures at the end of the line greater than a desired pressure lower than that produced by the pump at its outlet while fluid pressure is applied to the fluid motor and to the relief valve, and to assure complete relief of the lubricant pressure at the end of the line when the fluid source is disconnected from the motor and relief valve.

6. In a centralized lubrication system having lubricant pressure producing apparatus having an effective ratio, a source of lubricant, a source of operating fluid, and a lubricant distribution line, a pressure relief valve comprising: a first lubricant chamber connected with the end of the lubricant distribution line and with the source of lubricant, a second chamber connected with the source of fluid each time that fluid is connected to the system, and valve means including a reciprocable operating structure disposed in both chambers to control the flow of lubricant from the end of the line to the lubricant source, the reciprocable operating structure defining a pair of operating surfaces having relative effective areas with a ratio that is a predetermined amount smaller than the effective ratio of the lubricant pressure producing apparatus, one of the surfaces acted upon by the lubricant in the first chamber and the other surface acted upon by the fluid in the second chamber to prevent pressures at the end of the line greater than a desired pressure lower than that produced by the pump at its outlet while fluid pressure is applied to the lubricant pressure producing apparatus and to the relief valve and to assure complete relief of the lubricant pressure at the end of the line to the lubricant source when the fluid source is disconnected from the motor and relief valve.

7. A centralized lubrication system comprising a single-stroke, fixed-displacement lubricant pump with an effective ratio connected to a source of lubricant and having a lubricant outlet, a fluid motor for the pump connected to a first means intermittently producing in the motor a desired fluid pressure differing from atmospheric pressure to cause operation of the motor, a single lubrication line connected to the pump outlet, a plurality of lubricant measuring valves having lubricant inlets connected in parallel with each other to the lubricant line, and a pressure relief valve connected to the end of the lubricant line, said relief valve including a first chamber connected in lubricant conducting relation with the end of the line and with the source of lubricant, a second chamber connected to the first means producing in the second chamber the desired fluid pressure each time that the desired fluid pressure is produced in the motor, and valve means including a reciprocable operating structure disposed in both chambers to control the flow of lubricant from the end of the line to the lubricant source, the reciprocable operating structure defining a pair of operating surfaces having relative effective areas with a ratio that is a predetermined amount smaller than the effective pump ratio, one of the surfaces acted upon by the lubricant in the first chamber and the other surface acted upon by the fluid in the second chamber to prevent pressures at the end of the line greater than a desired pressure lower than that produced by the pump at its outlet while fluid pressure is applied to the fluid motor and to the relief valve and to assure complete relieving of the lubricant pressure at the end of the line when the fluid source is disconnected from the motor and relief valve.

8. In a lubrication system, a pressure control and relief valve comprising structure defining a first and second chamber substantially sealed from each other and having fluids under pressure therein, structure defining a fluid inlet passageway connected to the first chamber, structure defining fluid inlet and outlet passageways connected to the second chamber, valve means controlling the flow of fluid from the second chamber to the outlet passageway, said valve means including a reciprocable operating structure disposed in both chambers, the operating structure having a surface acted upon by the fluid in the second chamber producing a first force on the operating structure acting in a valve opening direction and having surfaces acted upon by the fluid in the first chamber and by atmosphere producing a second force on the operating structure acting in a valve closing direction to maintain the pressure in the second chamber at or below a desired value which is a direct function of the instantaneous value of the second force.

References Cited in the file of this patent

UNITED STATES PATENTS

| | | |
|---|---|---|
| 1,880,854 | Davis | Oct. 4, 1932 |
| 1,880,856 | Davis | Oct. 4, 1932 |
| 2,141,022 | Rotter | Dec. 20, 1938 |
| 2,727,530 | Grove et al. | Dec. 20, 1955 |